US 12,436,120 B2

(12) United States Patent
Kinugasa et al.

(10) Patent No.: US 12,436,120 B2
(45) Date of Patent: Oct. 7, 2025

(54) SAMPLE CONTAINER AND MEASURING METHOD

(71) Applicant: JEOL Ltd., Tokyo (JP)

(72) Inventors: Genki Kinugasa, Tokyo (JP); Kotaro Asami, Tokyo (JP)

(73) Assignee: JEOL Ltd., Tokyo (JP)

(*) Notice: Subject to any disclaimer, the term of this patent is extended or adjusted under 35 U.S.C. 154(b) by 163 days.

(21) Appl. No.: 18/211,372

(22) Filed: Jun. 19, 2023

(65) Prior Publication Data
US 2023/0408427 A1   Dec. 21, 2023

(30) Foreign Application Priority Data
Jun. 20, 2022   (JP) .................. 2022-098822

(51) Int. Cl.
G01N 23/2204   (2018.01)
G01N 23/223   (2006.01)

(52) U.S. Cl.
CPC ....... G01N 23/2204 (2013.01); G01N 23/223 (2013.01)

(58) Field of Classification Search
None
See application file for complete search history.

(56) References Cited

U.S. PATENT DOCUMENTS 12,247,935 B2 * 3/2025 Nagoshi ............ G01N 23/223
2001/0028698 A1   10/2001 Matoba et al.
2021/0018453 A1 * 1/2021 Kinugasa .......... G01N 23/2204
2021/0270757 A1   9/2021 Morihisa
2023/0296541 A1   9/2023 Morihisa

FOREIGN PATENT DOCUMENTS

| JP | 58204357 A | * | 11/1983 | ............ G01N 23/223 |
| JP | S58204357 A |  | 11/1983 | |
| JP | 2001349852 A |  | 12/2001 | |
| JP | 2003254919 A | * | 9/2003 | ............ G01N 23/223 |
| WO | WO-2004088296 A1 | * | 10/2004 | ............ G01N 23/223 |
| WO | 2022004000 A1 |  | 6/2022 | |

OTHER PUBLICATIONS

Extended European Search Report issued in EP23170827.2 on Nov. 15, 2023.
Office Action issued in JP2022098822 on Jun. 18, 2024.

* cited by examiner

Primary Examiner — David J Makiya
Assistant Examiner — Miya Downing
(74) Attorney, Agent, or Firm — The Webb Law Firm

(57) ABSTRACT

Provided is a sample container which is for use with an X-ray fluorescence analyzer and which permits measurement of light elements in a liquid. The sample container includes a sealable first receptacle, a pressure adjusting valve for adjusting the pressure in the first receptacle, a second receptacle receiving a liquid sample (S) and having both a first opening and a second opening located inside and outside, respectively, of the first receptacle, and an analytical film closing off the second opening and transmitting X-rays.

15 Claims, 12 Drawing Sheets

SAMPLE CONTAINER AND MEASURING METHOD

CROSS-REFERENCE TO RELATED APPLICATION

This application claims priority to Japanese Patent Application No. 2022-098822, filed Jun. 20, 2022, the disclosure of which is hereby incorporated by reference in its entirety.

BACKGROUND OF THE INVENTION

1. Field of the Invention

The present invention relates to a sample container and a measuring method.

2. Description of the Related Art

An X-ray fluorescence (XRF) analyzer can perform qualitative, quantitative, and other analyses by irradiating a sample with primary X-rays produced from an X-ray tube and detecting with a detector secondary X-rays responsively emanating from the sample.

In X-ray fluorescence analysis, when light elements within a liquid are analyzed, the interior of the sample chamber is replaced by helium gas and then a measurement is made. Air absorbs fluorescent X-rays generated from the sample. Especially, air absorbs fluorescent X-rays from light elements released from the sample strongly. Therefore, in general, measurements are performed after a vacuum atmosphere has been created in the sample chamber. However, in a vacuum, liquids evaporate or become frozen and thus light elements in a liquid cannot be measured. Therefore, the air in the sample chamber is replaced by helium gas which less absorbs fluorescent X-rays and then measurements are performed.

For example, JP-A-2001-349852 discloses an XRF analyzer which is designed to measure light elements in a sample and which includes a helium inlet port into an open chamber, a film attach-detach mechanism for attaching and detaching light-element film having a high X-ray transmissivity to and from an open portion of the chamber, and a gas outlet port for expelling gas from inside the chamber.

However, in order to replace the air inside the sample chamber with helium gas, a mechanism for replacing the air inside the sample chamber with helium gas is needed as in the XRF analyzer of JP-A-2001-349852. Furthermore, a facility for managing high-pressure helium gas is necessary.

SUMMARY OF THE INVENTION

One aspect of the sample container associated with the present invention is for use with an X-ray fluorescence (XRF) analyzer and comprises:
- a sealable first receptacle having a pressure therein;
- a pressure adjusting valve for adjusting the pressure in the first receptacle;
- a second receptacle for receiving a liquid sample and having both a first opening and a second opening located inside and outside, respectively of the first receptacle; and
- an analytical film closing off the second opening and transmitting X-rays.

In this sample container, the pressure in the first receptacle can be adjusted with the pressure adjusting valve and therefore, within the sample chamber in a vacuum atmosphere, the interior of the first receptacle can be maintained at a pressure higher than the pressure at which the liquid sample boils and lower than the pressure at which the analytical film is damaged. The use of the sample container makes it possible to perform measurements using the XRF analyzer while placing the interior of the sample chamber in a vacuum atmosphere. Consequently, the light elements in the liquid sample can be measured without replacing the interior of the sample chamber with helium.

One aspect of a measuring method associated with the present invention uses a sample container which includes:
- a sealable first receptacle having a pressure therein;
- a pressure adjusting valve for adjusting the pressure in the first receptacle;
- a second receptacle for receiving a liquid sample and having both a first opening and a second opening located inside and outside, respectively of the first receptacle; and
- an analytical film closing off the second opening and transmitting X-rays.

The measuring method comprises the steps of: receiving a liquid sample in the first receptacle; introducing the sample container into a sample chamber of an XRF analyzer; lowering the pressure in the sample chamber such that the sample chamber is placed in a vacuum atmosphere; irradiating the liquid sample received in the sample container with X-rays through the analytical film within the vacuum atmosphere of the sample chamber; and detecting fluorescent X-rays responsively emitted from the liquid sample.

In this measuring method, the pressure in the first receptacle can be adjusted with the pressure adjusting valve. Therefore, in the vacuum atmosphere of the sample chamber, the pressure in the first receptacle can be maintained higher than the pressure at which the liquid sample boils and lower than the pressure at which the analytical film is damaged. Thus, the use of the sample container permits the XRF analyzer to perform measurements while placing the interior of the sample chamber in a vacuum atmosphere. Consequently, light elements in the liquid sample can be measured without replacing the air within the sample chamber by helium.

DESCRIPTION OF THE INVENTION

The preferred embodiments of the present invention are hereinafter described in detail with reference to the drawings. It is to be understood that the embodiments provided below do not unduly restrict the scope and content of the present invention delineated by the appended claims and that not all the configurations described below are essential constituent components of the invention.

1. First Embodiment 1.1. Sample Container

Figure 1:
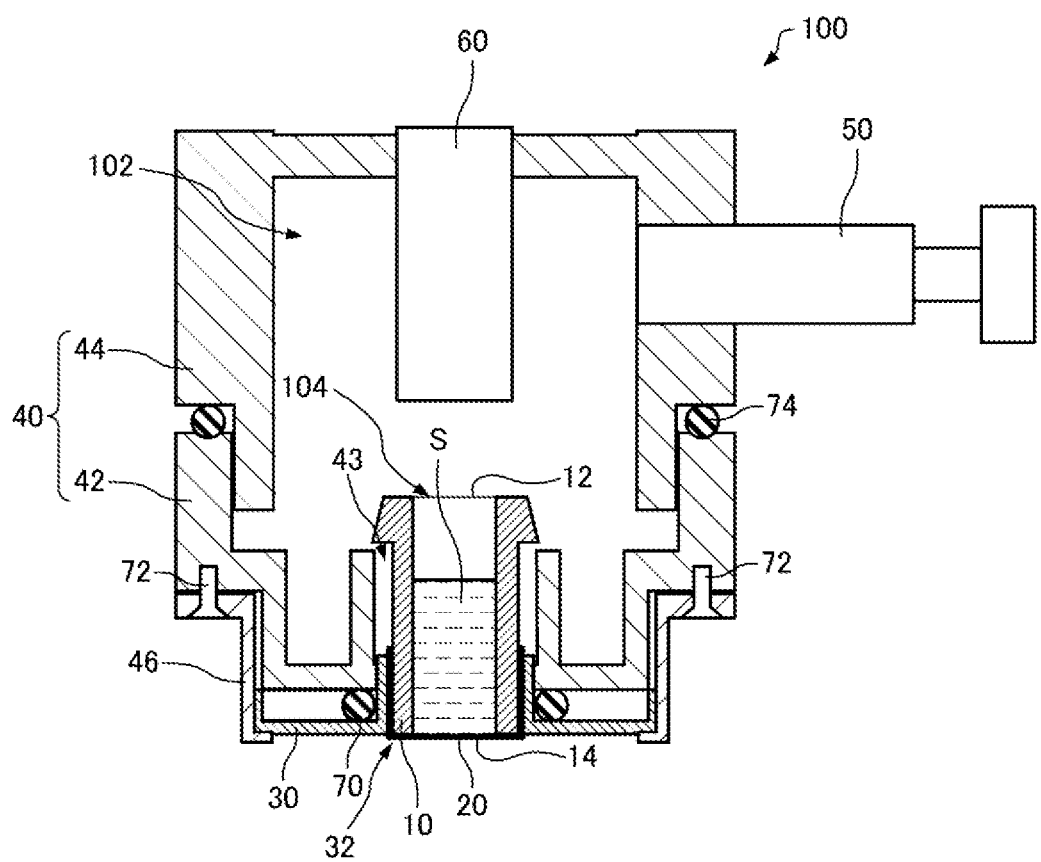
FIG. 1 is a schematic vertical cross-sectional view of a sample container associated with a first embodiment of the present invention.

A sample container associated with a first embodiment of the present invention is first described by referring to FIG. 1, which schematically shows this sample container, 100. The sample container 100 is for use with an X-ray fluorescence (XRF) analyzer and permits a liquid sample S to be measured in a sample container that is in a vacuum atmosphere.

As shown in FIG. 1, the sample container 100 includes a sample cup 10 (one example of a second receptacle), an analytical film 20 (i.e., film for analytical use), a film supporting member 30, a sealed receptacle 40 (one example of a first receptacle), a pressure adjusting valve and a leak valve 60. FIG. 1 shows a state where the sample cup 10 has been mounted to the sealed receptacle 40.

The liquid sample S to be measured is received in the sample cup 10. Examples of the liquid sample S to be measured include foods (such as drinking water), cleaning fluids (such as organic solvents), alcohols (such as ethanol), and oils.

The sample cup 10 is cylindrical, for example, and has a first opening 12 and a second opening 14. The first opening 12 is at the top of the sample cup 10, while the second opening 14 is at the bottom of the sample cup 10. When the sample cup 10 has been mounted to the sealed receptacle 40, the first opening 12 is located inside the sealed receptacle 40, whereas the second opening 14 is located outside the sealed receptacle 40. The second opening 14 is closed off by the analytical film 20.

In the sample container 100, plural kinds of sample cups of different diameters can be used as the sample cup 10. The region irradiated with the primary X-rays can be increased in area by increasing the diameter of the sample cup 10 so as to increase the area of the second opening 14, in which case, however, the analytical film 20 tends to be damaged more easily due to the pressure difference between the inside and outside of the sealed receptacle 40. In the sample container 100, the optimum sample cup 10 can be selected from plural kinds of sample cups of different diameters according to the type of the liquid sample S to be measured, the element to be measured, the purpose of the measurement, and other factors.

The analytical film 20 transmits X-rays and is an organic film as made of Prolene or Mylar. A Prolene film used as the analytical film 20 has a thickness of about 4 μm, for example. A Mylar film used as the analytical film 20 has a thickness of about 1.5 μm, for example. The thickness or material of the analytical film 20 can be varied according to the type of the liquid sample S to be measured, the element to be measured, the purpose of the measurement, the diameter of the sample cup 10, or other factor.

The analytical film 20 is detachably supported to the sample cup 10 by the film supporting member 30 that is a disklike member and centrally provided with a hole 32 into which the sample cup 10 can be inserted. When the analytical film 20 and the sample cup 10 are inserted into the hole 32 of the film supporting member 30, the sample cup 10 and the film supporting member 30 are secured while the second opening 14 of the sample cup 10 is covered with the analytical film 20.

The sealed receptacle 40 is internally sealable and includes a base 42, a cover 44, and a sample cup supporting member 46. The base 42 is provided with a hole 43 into which the sample cup 10 can be inserted. The sample cup supporting member 46 for supporting the sample cup 10 is mounted to the base 42. In the illustrated example, the disklike film supporting member 30 is supported by the sample cup supporting member 46, whereby the sample cup 10 integrally coupled to the film supporting member 30 is secured to the sealed receptacle 40. The gap between the sample cup 10 coupled to the film supporting member 30 and the base 42 is hermetically sealed with an O-ring 70. The sample cup supporting member 46 is secured to the base 42 with screws 72.

The pressure adjusting valve 50 and the leak valve 60 are mounted to the cover 44. In the sample chamber of the XRF analyzer which is in a vacuum atmosphere, the interior of the sealed receptacle 40 is maintained at a constant pressure, for example, between 600 Pa and atmospheric pressure, by the pressure adjusting valve 50.

The gap between the base 42 and the cover 44 is hermetically sealed by an O-ring 74. The base 42 and the cover 44 together form a space 102 in which the first opening 12 of the sample cup 10 is placed. Therefore, the pressure in a space 104 within the sample cup 10 is equal to that in the space 102 within the sealed receptacle 40.

The pressure adjusting valve 50 operates such that the pressure difference between the inside and outside of the sealed receptacle 40 within the vacuum atmosphere inside the sample container of the XRF analyzer is equal to a preset pressure. The pressure in the sealed receptacle 40 is the pressure inside the space 102 of the receptable 40. The pressure outside of the sealed receptacle 40 is the pressure inside the sample chamber.

The pressure adjusting valve 50 opens if the pressure in the sealed receptacle 40 is greater than the pressure outside the sealed receptacle 40 and, at the same time, the pressure difference between the inside and the outside of the sealed receptacle 40 is greater than the preset pressure. The pressure adjusting valve 50 closes either if the pressure inside the sealed receptacle 40 is greater than the pressure outside the sealed receptacle 40 and, at the same time, the pressure difference between the inside and the outside of the sealed receptacle 40 is equal to or less than a preset pressure or if the pressure inside the sealed receptacle 40 is equal to or less than the pressure outside the sealed receptacle 40. The preset pressure of the pressure adjusting valve 50 is variable.

Figure 2:
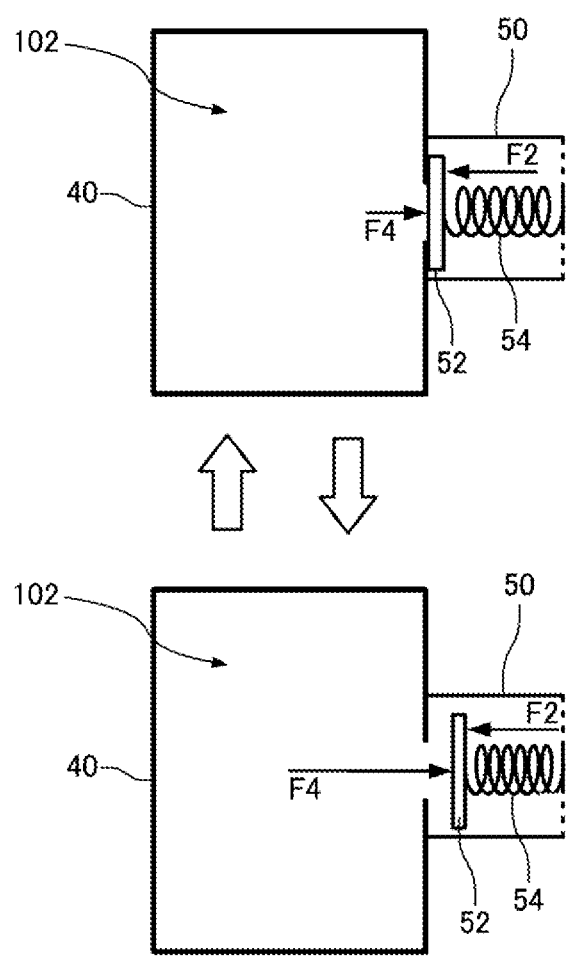
FIG. 2 illustrates a pressure adjusting valve.

FIG. 2 illustrates the pressure adjusting valve 50 which includes a valve body 52 and a spring 54. The pressure adjusting valve 50 adjusts the pressure in the sealed receptacle 40 using the spring 54.

If both inside and outside of the sealed receptacle 40 are at atmospheric pressure, the valve body 52 of the pressure adjusting valve 50 is closed by a force F2 of the spring 54. If the sample chamber of the XRF analyzer is evacuated to a vacuum such that the pressure outside the sealed receptacle 40 drops, the pressure inside the sealed receptacle 40 becomes greater than the pressure outside the sealed receptacle 40, and the pressure difference between the inside and outside of the sealed receptacle 40 exceeds the preset pressure, then the force F2 of the spring 54 that closes the valve body 52 is exceeded by a force F4 applied to the valve body 52 due to the pressure difference between the inside and outside of the sealed receptacle 40. In consequence, the valve body 52 is opened, so that the inside and outside of the sealed receptacle 40 are placed in communication with each other. As a result, the pressure inside the sealed receptacle 40 drops. If the pressure difference between the inside and outside of the sealed receptacle 40 decreases below a preset level, the force F2 of the spring 54 closing the valve body 52 exceeds the force F4 applied to the valve body 52 due to the pressure difference between the inside and outside of the sealed receptacle 40, thus closing the valve body 52.

The pressure in the inside space 102 of the sealed receptacle 40 can be maintained constant by opening or closing the valve body 52 according to the pressure difference between the inside and outside of the sealed receptacle 40 in this way. Furthermore, the preset pressure can be varied by varying the length of the spring 54 so as to adjust the force F2 of the spring 54 closing the valve body 52.

If the pressure inside the sealed receptacle 40 is equal to or less than the pressure outside the sealed receptacle 40 in a manner not illustrated, the force F4 applied to the valve body 52 due to the pressure difference between the inside and outside of the sealed receptacle 40 acts to close the valve body 52. Consequently, the valve body 52 is closed.

The leak valve 60 is used to return the interior of the sealed receptacle 40 to atmospheric pressure. The leak valve 60 opens, for example, if the pressure outside the sealed receptacle 40 is greater than the pressure in the sealed receptacle 40. The leak valve 60 closes, for example, if the pressure outside the sealed receptacle 40 is equal to or less than the pressure in the sealed receptacle 40. The leak valve 60 opens and closes its valve body according to the pressure difference between the inside and outside of the sealed receptacle 40 using a spring in the same manner, for example, as the pressure adjusting valve 50.

Figure 3:
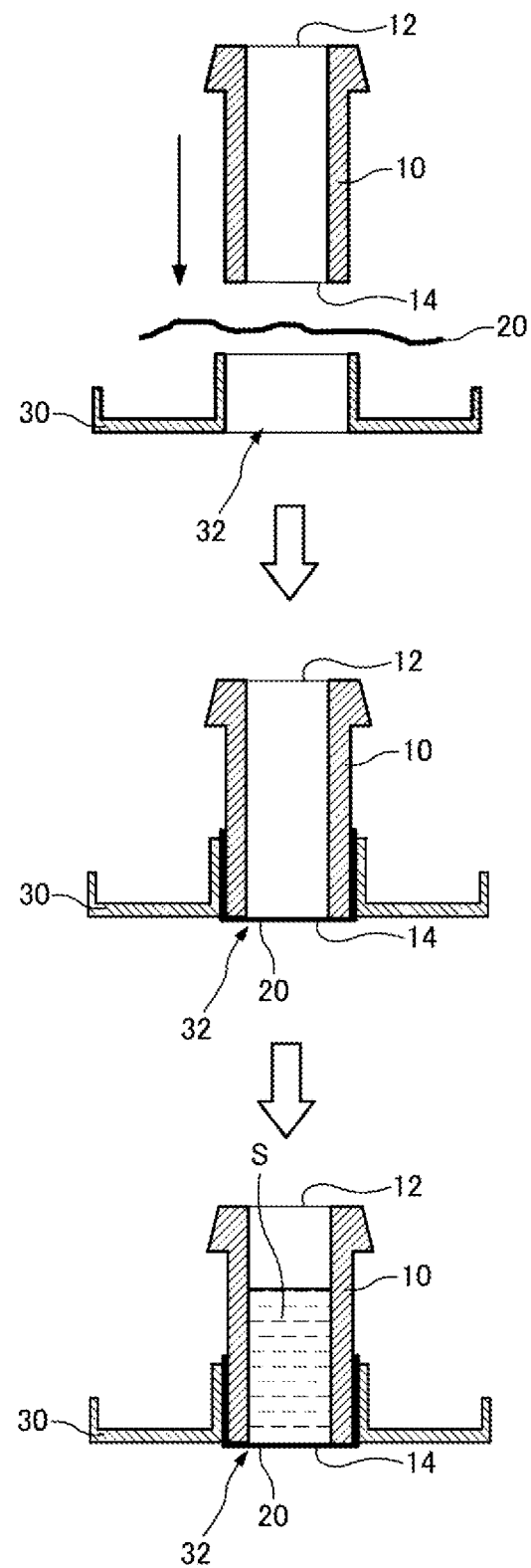
FIG. 3 shows cross sections illustrating a method of charging a liquid sample into a sample cup.

FIG. 3 illustrates a method of charging the liquid sample S into the sample cup 10. First, the second opening 14 of the sample cup 10 is covered by the analytical film 20. Under this condition, the sample cup 10 is inserted into the central hole 32 of the film supporting member 30. Consequently, the sample cup 10 is secured to the film supporting member 30. At this time, the analytical film 20 is squeezed in between the sample cup 10 and the film supporting member 30. The film 20 is fixedly stretched across the second opening 14. As a result, the sample cup 10 and the film supporting member 30 are integrally coupled together. The analytical film 20 can plug up the second opening 14.

Then, the liquid sample S is poured through the first opening 12 of the sample cup 10, thus charging the liquid sample S into the sample cup 10. The sample cup 10 charged with the liquid sample S in this way is loaded into the sealed receptacle 40 as shown in FIG. 1. Alternatively, the liquid sample S may be charged into the sample cup 10 after the cup 10 is loaded into the sealed receptacle 40 in a manner not illustrated.

1.2. X-Ray Fluorescence (XRF) Analyzer

Figure 4:
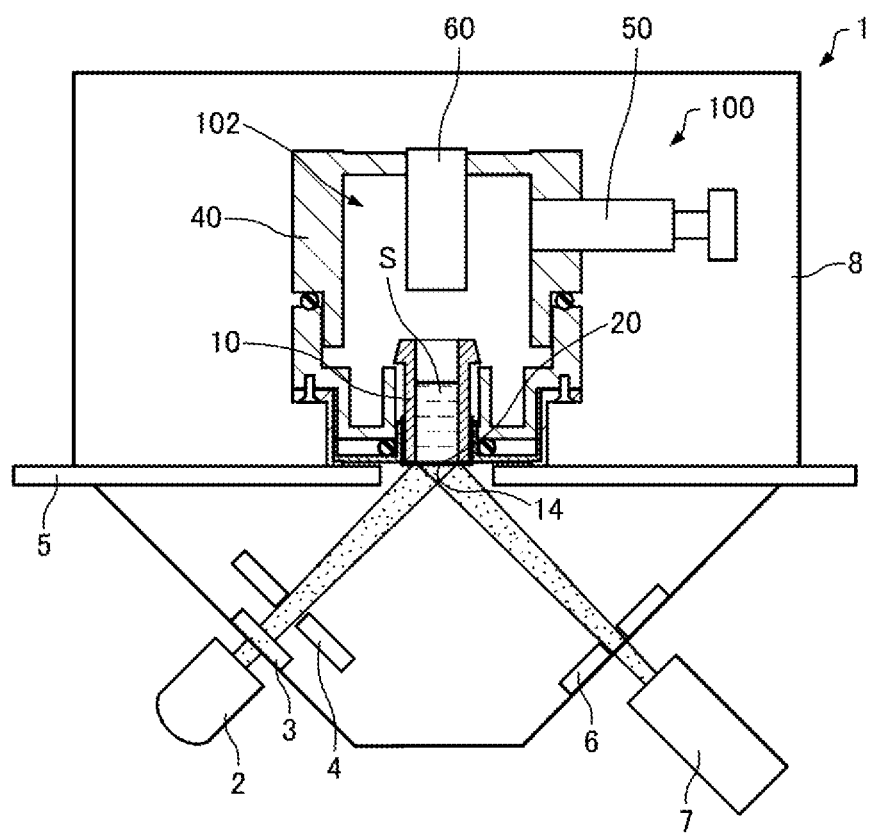
FIG. 4 is a schematic diagram illustrating an operational state where the sample container of FIG. 1 has been placed in the sample chamber of an XRF analyzer.

FIG. 4 illustrates a state where the sample container 100 is placed in the sample chamber 8 of the XRF analyzer 1. The XRF analyzer 1 is an apparatus for performing analysis by X-ray fluorescence spectrometry which is a technique of analyzing the liquid sample S by irradiating it with primary X-rays and detecting secondary X-rays produced from the liquid sample S in response to the irradiation.

As shown in FIG. 4, the XRF analyzer 1 includes the sample container 100, an X-ray tube 2, a filter 3, a primary X-ray collimator 4, a support plate 5, a secondary X-ray collimator 6, and a detector 7. As shown, the sample container 100 is received in the sample chamber 8 of the XRF analyzer 1. Received in the sample chamber 8 are the filter 3, primary X-ray collimator 4, support plate 5, and secondary X-ray collimator 6, for example. Alternatively, the X-ray tube 2 and the detector 7 may also be received in the sample chamber 8. The XRF analyzer 1 is equipped with a vacuum pump (not shown) for evacuating the sample chamber 8 to a vacuum.

When the liquid sample S is measured using the sample container 100, the sample chamber 8 is placed in a vacuum atmosphere at a given pressure. During measurement, the sample chamber 8 is maintained at the given pressure by the vacuum pump. The interior of the sealed receptacle 40 of the sample chamber 8 in the vacuum atmosphere is maintained at a pressure higher than the given pressure inside the sample chamber 8. Within the sample chamber 8 in the vacuum atmosphere, the interior of the sealed receptacle 40 is maintained by the pressure adjusting valve 50 at a pressure which is higher than the pressure at which the liquid sample S boils and lower than the pressure at which the analytical film 20 is damaged.

The X-ray tube 2 produces primary X-rays. Voltage and current applied to the X-ray tube 2 are set according to the material of the liquid sample S and the element to be analyzed. The filter 3 passes the X-rays generated by the X-ray tube 2. By directing X-rays at the liquid sample S through the filter 3, parts of continuous X-rays and characteristic X-rays can be absorbed into the filter 3 and their components can be filtered out. Consequently, the peak to background ratio or other characteristic can be improved. The XRF analyzer 1 has plural filters 3 which differ in attenuation band. One used for measurement is selected from the plural filters 3 according to the element to be measured.

The primary X-ray collimator 4 limits the region of the liquid sample S irradiated with the X-rays and thus controls the size of the irradiated region. The size of the irradiated region is determined according to the diameter of the sample cup 10, i.e., according to the area of the second opening 14.

The support plate 5 mechanically supports the sample container 100 and is provided with an opening through which primary X-rays are directed at the analytical film 20 of the sample container 100. The primary X-rays pass through the analytical film 20 and impinge on the liquid sample S. In response, secondary X-rays are emitted from the liquid sample S, are transmitted through the analytical film 20, and are released through the opening of the support plate 5.

The secondary X-ray collimator 6 limits the usable region of the liquid sample S from which the secondary X-rays are emitted and detected, and permits efficient detection of the secondary X-rays of interest. When a sample is irradiated with primary X-rays, X-rays are emitted from the sample and referred to as secondary X-rays which include fluorescent X-rays and scattered X-rays. When a sample is irradiated with primary X-rays, X-rays are emitted by scattering of atoms and electrons and referred to as scattered X-rays. When a sample is irradiated with primary X-rays, inner shell electrons of atoms are excited, leaving inner shell vacancies. When outer shell electrons fill these vacancies, X-rays known as fluorescent X-rays are released.

The detector 7 detects secondary X-rays emitted from the liquid sample S and is a semiconductor detector, for example. As an example, the detector 7 is an energy dispersive X-ray spectrometer (EDS). Alternatively, the detector 7 may be a wavelength dispersive X-ray spectrometer (WDS).

In the XRF analyzer 1, the sample chamber 8 is in a vacuum atmosphere and so light elements in the liquid sample S can be detected with high sensitivity.

1.3. Measuring Method

Figure 5:
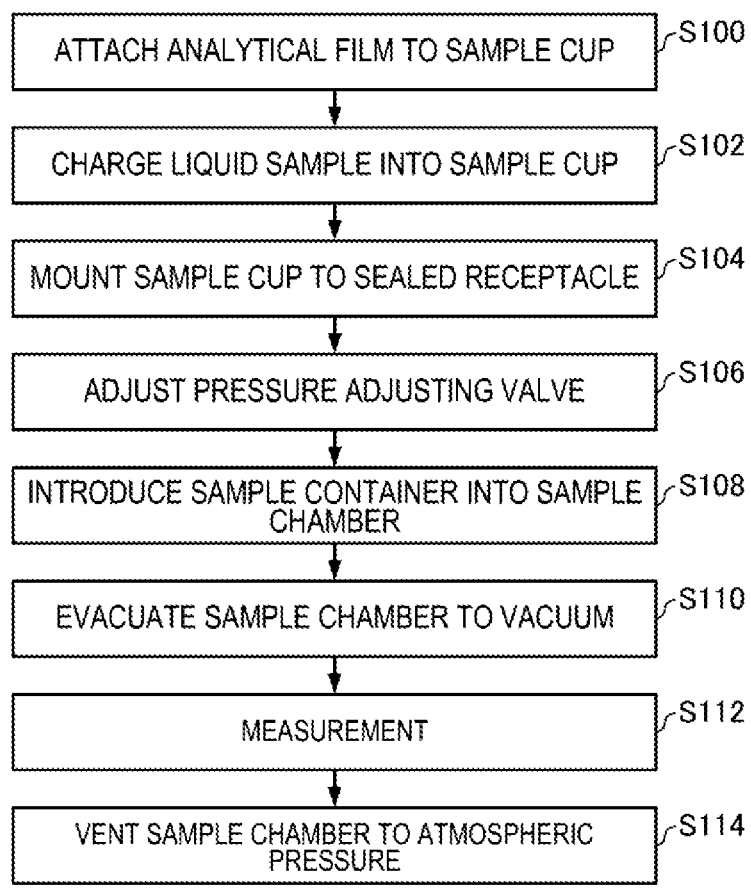
FIG. 5 is a flowchart illustrating one example of a measuring method using the sample container of FIG. 1.

FIG. 5 is a flowchart illustrating one example of a measuring method using the sample container 100. First, as shown in FIG. 3, the analytical film 20 is attached to the sample cup 10 (S100). For example, the optimum sample cup 10 is selected from plural sample cups of differing diameters according to the type of the liquid sample S to be measured, the element to be measured, the purpose of the measurement, and other factors. Then, the optimum analytical film 20 is selected according to the type of the liquid sample S to be measured, the element to be measured, the purpose of the measurement, the diameter of the sample cup 10, and other factors.

Then, the analytical film 20 is attached onto the sample cup 10 by inserting the sample cup 10 whose second opening 14 is covered by the analytical film 20 into the hole 32 of the film supporting member 30. Consequently, the sample cup 10 and the film supporting member 30 are coupled together integrally, and the second opening 14 is covered by the analytical film 20.

Then, the liquid sample S is charged into the sample cup 10 (S102). As shown in FIG. 1, the sample cup 10 is then mounted into the sealed receptacle 40 (S104). The sample cup 10 is inserted into the hole 43 of the base 42 and supported by the sample cup supporting member 46. Consequently, the sample cup 10 can be mounted in the sealed receptacle 40.

The pressure adjusting valve 50 is then adjusted (S106). In this example, a preset pressure for the pressure adjusting valve 50 is determined such that the pressure in the sealed receptacle 40 within the sample chamber 8 in the vacuum atmosphere at a given pressure is higher than the pressure at which the liquid sample S boils and lower than the pressure at which the analytical film 20 is damaged. Accordingly, the preset pressure is determined according to the vapor pressure of the liquid sample S, the diameter of the sample cup 10 (or the area of the second opening 14), the pressure in the sample chamber 8, and other factors.

Then, as shown in FIG. 4, the sample container 100 containing the liquid sample S is admitted into the sample chamber 8 of the XRF analyzer 1 (S108) after opening the cover of the sample chamber in a manner not illustrated.

The sample chamber 8 is then evacuated and placed in a vacuum atmosphere at a given pressure (S110). The sample chamber 8 is pumped down to a given pressure at which X-rays from light elements released from the liquid sample S can be detected by the detector 7. As the pressure in the sample chamber 8 drops, the pressure in the sealed receptacle 40 also decreases but the pressure difference between the inner space 102 of the sealed receptacle 40 and the sample chamber 8 outside the sealed receptacle 40 is maintained at a preset pressure by the operation of the pressure adjusting valve 50. The interior of the sealed receptacle 40 is maintained at a pressure higher than the pressure at which the liquid sample S boils and lower than the pressure at which the analytical film 20 is damaged. Then, the liquid sample S is measured by X-ray fluorescence spectrometry (S112).

If the pressure in the sample chamber 8 reaches a preset given pressure and becomes constant, a measurement is started. In particular, primary X-rays generated by the X-ray tube 2 are directed at the liquid sample S in the sample cup 10 through both the filter 3 and the primary X-ray collimator 4. The primary X-rays are transmitted through the analytical film 20 and hit the liquid sample S. In response, secondary X-rays are emitted from the liquid sample S, passed through the analytical film 20, and detected by the detector 7 via the secondary X-ray collimator 6.

As described previously, the pressure in the sealed receptacle 40 is higher than the pressure at which the liquid sample S boils and so the liquid sample S can be measured without boiling it. Furthermore, the pressure in the sealed receptacle 40 is lower than the pressure at which the analytical film 20 is damaged and, therefore, damage to the film 20 can be prevented. Additionally, the sample chamber 8 can be placed in a vacuum atmosphere. Consequently, attenuation of secondary X-rays emitted from the liquid sample S can be reduced. As a result, light elements, for example, can be measured with high sensitivity.

After the end of the measurement, the sample chamber 8 is vented to atmospheric pressure (S114). This increases the pressure in the sample chamber 8. The pressure in the sealed receptacle 40 is also increased by the operation of the leak valve 60. As a result, damage to the analytical film 20 can be prevented. The interior of the sealed receptacle 40 can be placed at atmospheric pressure. Because of the processing steps described so far, the liquid sample S can be measured.

1.4. Advantageous Effects

The sample container 100 is for use with an X-ray fluorescence (XRF) analyzer and includes the sealable receptacle 40, the pressure adjusting valve 50 for adjusting the pressure in the sealed receptacle 40, the sample cup 10 receiving the liquid sample S and having both the first opening 12 and the second opening 14 located inside and outside, respectively, of the sealed receptacle 40, and the analytical film 20 plugging up the second opening 14 and transmitting X-rays.

In the sample container 100, the pressure in the sealed receptacle 40 can be adjusted with the pressure adjusting valve 50. Therefore, the interior of the sealed receptacle 40 can be maintained at a pressure which is higher than the pressure at which the liquid sample S boils and lower than the pressure at which the analytical film 20 is damaged within the sample chamber 8 in a vacuum atmosphere. Thus, the use of the sample container 100 makes it possible to perform a measurement while placing the sample chamber 8 of the XRF analyzer 1 in a vacuum atmosphere. In consequence, light elements in the liquid sample S can be measured without replacing the interior environment of the sample chamber 8 by helium.

In the sample container 100, the pressure adjusting valve 50 maintains constant the pressure difference between the inside and outside of the sealed receptacle 40 in a vacuum atmosphere. Therefore, in the sample container 100, damage to the analytical film 20 can be prevented.

In the sample container 100, the pressure adjusting valve 50 opens, if the pressure in the sealed receptacle 40 is greater than the outside pressure and, at the same time, the pressure difference between the inside and outside of the sealed receptacle 40 is greater than the preset pressure, and closes, if the pressure in the sealed receptacle 40 is greater than the outside pressure and, at the same time, the pressure difference between the inside and outside of the sealed receptacle 40 is equal to or less than the preset pressure which is variable. Therefore, in the sample container 100, the preset pressure can be varied according to both the diameter of the sample cup 10 and the mechanical strength of the analytical film 20 which is determined by the thickness and the material. Accordingly, in the sample container 100, measurements can be performed using sample cups 10 of various diameters and various types of analytical films 20.

The sample container 100 includes the film supporting member 30 by which the analytical film 20 is detachably supported. Therefore, the analytical film 20 of optimum thickness and optimum material can be used in the sample container 100 according to the type of the liquid sample S to be measured, the element to be measured, the purpose of the measurement, the diameter of the sample cup 10, and other factors.

2. Second Embodiment

Figure 6:
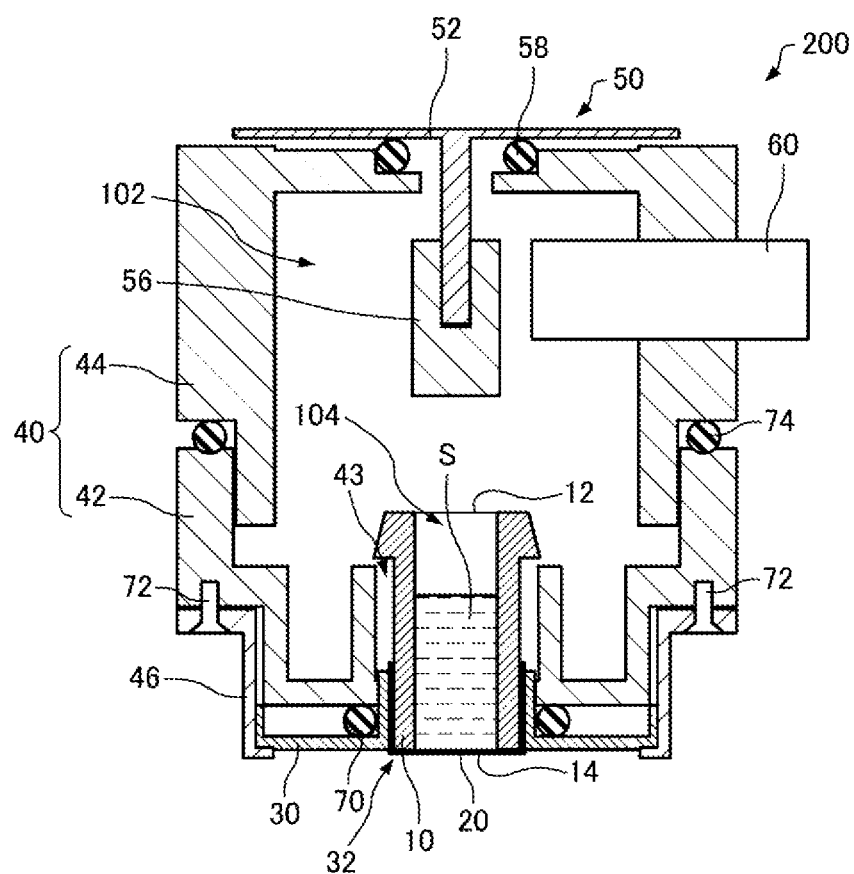
FIG. 6 is a schematic cross-sectional view of a sample container associated with a second embodiment.

A sample container associated with a second embodiment is next described by referring to FIG. 6, which is a cross section schematically showing the sample container, 200, associated with the second embodiment. In the following description, those members of the sample container 200 which are similar in function to their respective counterparts of the sample container 100 associated with the first embodiment are indicated by the same reference numerals as in the foregoing figures and a detailed description thereof is omitted.

In the above-stated sample container 100 of FIG. 1, the pressure adjusting valve 50 opens and closes the valve body 52 according to the pressure difference between the inside and outside of the sealed receptacle 40 using the spring 54.

In contrast, in the sample container 200, the pressure adjusting valve 50 opens and closes the valve body 52 according to the pressure difference between the inside and outside of the sealed receptacle 40 using a weight 56. In the example shown in FIG. 6, the weight 56 applies a force to close the valve body 52. When using the weight 56, the pressure adjusting valve 50 operates in the same manner as when using the spring 54.

For example, when both the inside and outside of the sealed receptacle 40 are at atmospheric pressure, the valve body 52 of the pressure adjusting valve 50 is closed by the force of the weight 56. Under this condition, the gap between the valve body 52 and the sealed receptacle 40 is hermetically sealed with the O-ring 58.

If the sample chamber 8 of the XRF analyzer is evacuated to a vacuum, the pressure outside the sealed receptacle 40 drops, the pressure inside the sealed receptacle 40 becomes greater than the pressure outside the sealed receptacle 40, and the pressure difference between the inside and outside of the sealed receptacle 40 exceeds the preset pressure, then the force of the weight 56 to close the valve body 52 is exceeded by the force applied to valve body 52 due to the pressure difference between the inside and outside of the sealed receptacle 40. As a result, the valve body 52 opens, placing the inside and outside of the sealed receptacle 40 in communication with each other.

As the valve body 52 opens, the pressure in the sealed receptacle 40 drops. If the pressure difference between the inside and outside of the sealed receptacle 40 decreases below the preset pressure, then the force of the weight 56 to close the valve body 52 exceeds the force applied to the valve body 52 due to the pressure difference between the inside and outside of the sealed receptacle 40. As a result, the valve body 52 closes.

In this way, when the valve body 52 is opened and closed using the weight 56 according to the pressure difference between the inside and outside of the sealed receptacle 40, the pressure adjusting valve 50 operates in the same manner as when the valve body 52 is opened and closed according to the pressure difference between the inside and outside of the sealed receptacle 40 using the spring 54. The preset pressure can be varied by changing the weight of the weight 56 so as to adjust the force of the weight 56 to close the valve body 52.

The configuration of the pressure adjusting valve 50 is not restricted to the examples of FIGS. 1 and 6. There is no restriction on the configuration as long as the pressure inside the sealed receptacle 40 can be adjusted.

3. Third Embodiment

Figure 7:
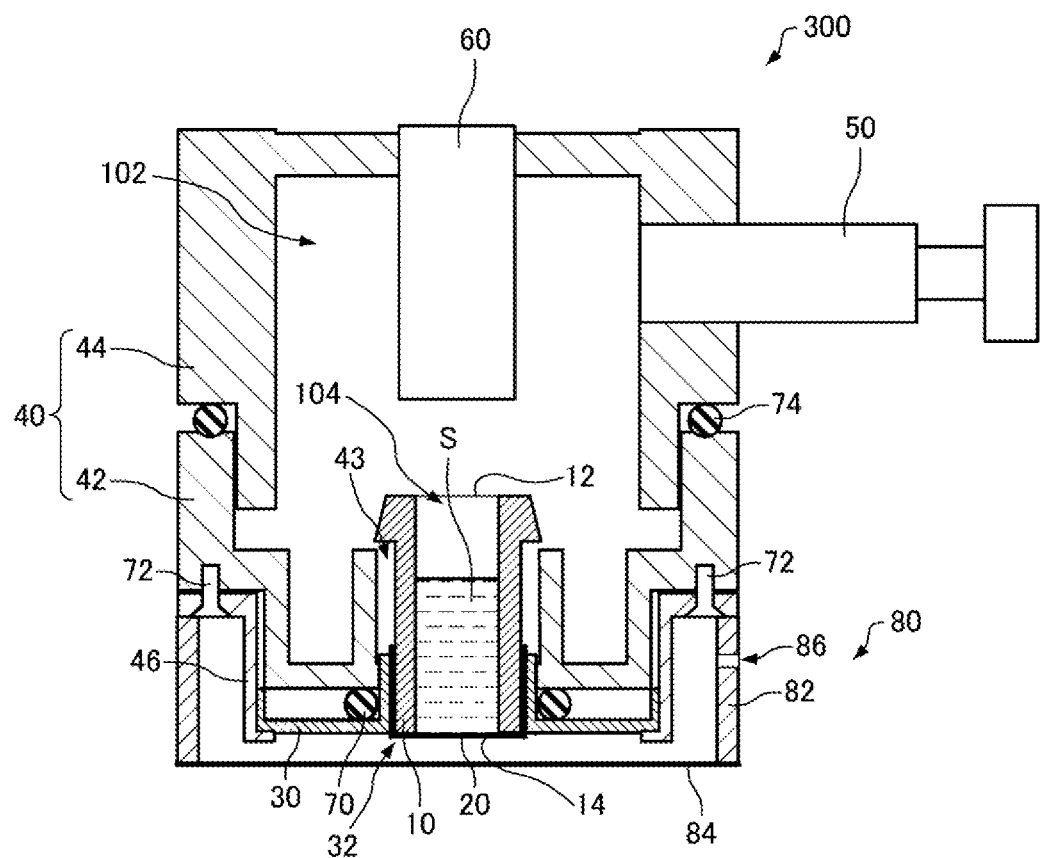
FIG. 7 is a schematic cross-sectional view of a sample container associated with a third embodiment.
Figure 8:
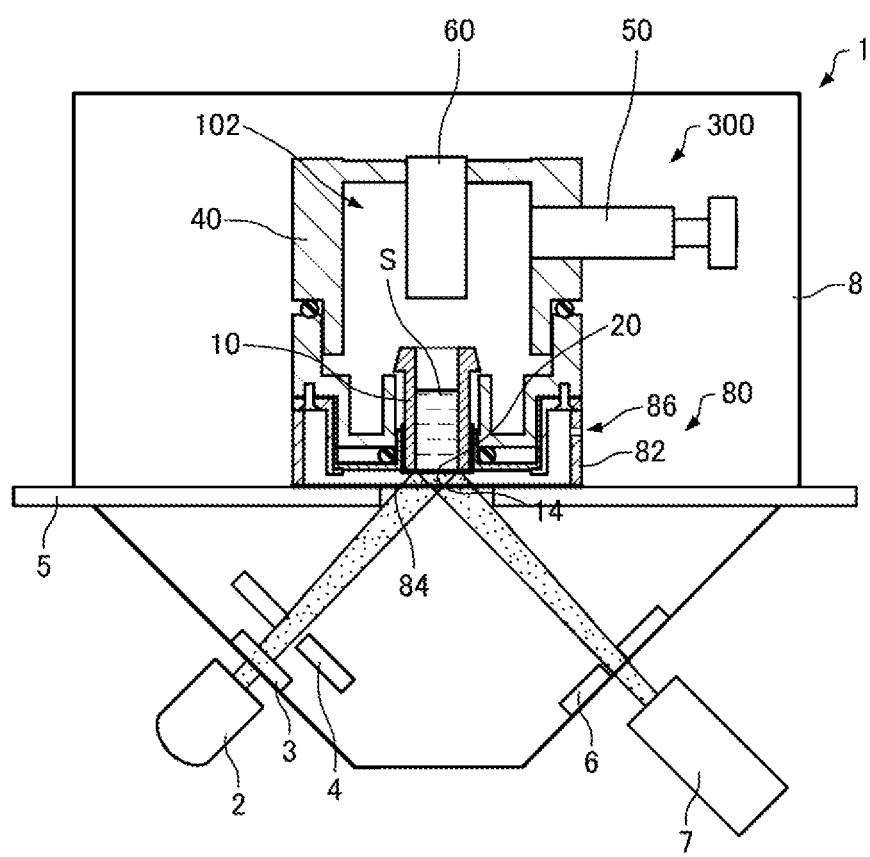
FIG. 8 is a diagram illustrating an operational state where the sample container of FIG. 7 has been placed in the sample chamber of an XRF analyzer.

A sample container associated with a third embodiment is next described by referring to FIGS. 7 and 8. FIG. 7 is a schematic cross-sectional view of the sample container, 300, associated with the third embodiment. FIG. 8 illustrates a state in which the sample container 300 is placed in the sample chamber 8 of the XRF analyzer 1. Those members of the sample container 300 which are similar in function to their counterparts of the sample container 100 associated with the first embodiment are indicated by the same reference numerals as in the foregoing figures and a detailed description thereof is omitted.

As shown in FIG. 7, the sample container 300 includes a protective receptacle 80. In the sample container 300, if the analytical film 20 is damaged and the liquid sample S leaks out, the protective receptacle 80 accepts the leaking sample S. Therefore, if the analytical film 20 is damaged, it can be prevented that the liquid sample S splashes and spoils the XRF analyzer 1.

The protective receptacle 80 is secured to the sealed receptacle 40 and includes a cylindrical protective cup 82 and a protective film 84. The protective cup 82 has an opening at its bottom, the opening being plugged up by the protective film 84. The second opening 14 of the sample cup 10 that is plugged up by the analytical film 20 is located in the protective cup 82. Therefore, if the analytical film 20 is damaged and the liquid sample S leaks out, it can be accepted by the protective receptacle 80.

The protective film 84 transmits X-rays and is made of the same material, for example, as the analytical film 20. As shown in FIG. 8, primary X-rays are transmitted through the protective film 84 and the analytical film 20 and impinge on the liquid sample S. Secondary X-rays are transmitted through the analytical film 20 and the protective film 84 and detected by the detector 7.

The protective cup 82 has a ventilation hole 86 forming a gas passageway that interconnects the inside and outside of the protective cup 82. Therefore, as shown in FIG. 8, if the sample chamber 8 is evacuated to a vacuum and the pressure varies from atmospheric pressure to the vacuum, the inside and outside of the protective cup 82 can be made equal in pressure. Accordingly, damage to the protective film 84 can be prevented. The ventilation hole 86 is a through hole formed, for example, in the protective cup 82. The protective cup 82 is only required to have a gas passageway interconnecting the inside and outside of the protective cup 82. For example, the gap between the protective cup 82 and the sealed receptacle 40 may be used as the gas passageway that interconnects the inside and outside of the protective cup 82.

4. Fourth Embodiment

4.1. Sample Container

Figure 9:
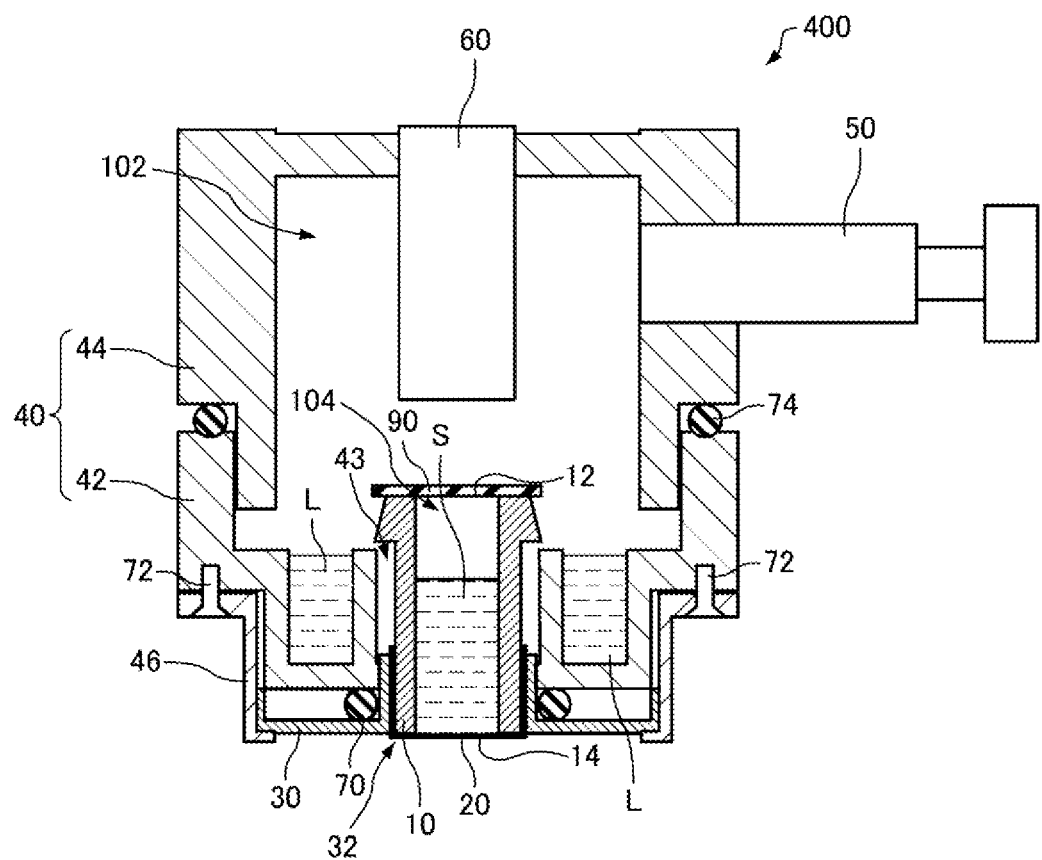
FIG. 9 is a schematic cross-sectional view of a sample container associated with a fourth embodiment.
Figure 10:
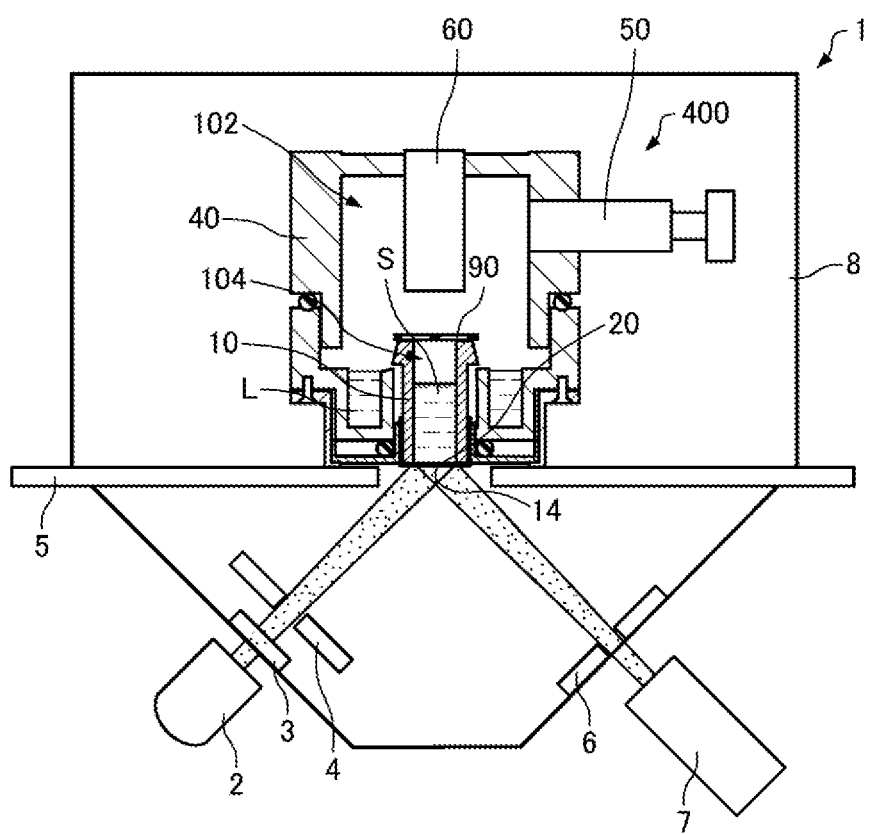
FIG. 10 is a diagram illustrating an operational state where the sample container of FIG. 9 has been placed in the sample chamber of an XRF analyzer.

A sample container associated with a fourth embodiment is next described by referring to FIGS. 9 and 10. FIG. 9 is a schematic cross-sectional view of the sample container, 400, associated with the fourth embodiment. FIG. 8 illustrates a state in which the sample container 400 is placed in the sample chamber 8 of the XRF analyzer 1. In the following description, those members of the sample container 400 which are similar in function to their respective counterparts of the sample container 100 associated with the first embodiment are indicated by the same reference numerals as in the foregoing figures and a detailed description thereof is omitted.

As shown in FIG. 9, the sample container 400 includes a porous film 90 for producing a pressure difference between the space 102 inside the sealed receptacle 40 and the space 104 inside the sample cup 10. The porous film 90 is made of a polypropylene film, unwoven cloth, or the like. A film used as a separator in a lithium ion battery may also be used as the porous film 90.

The porous film 90 is mounted across the first opening 12 of the sample cup 10. In the illustrated example, the first opening 12 of the sample cup 10 is plugged up by the porous film which can partition the space 102 in the sealed receptacle 40 and the space 104 in the sample cup 10 from each other.

A pressure adjusting liquid L is received in the sealed receptacle 40 and adjusts the pressure in the interior space 102 of the sealed receptacle 40. The pressure adjusting liquid L is the same, for example, as the liquid sample S. Alternatively, the pressure adjusting liquid L may be different in type from the liquid sample S. For example, the pressure adjusting liquid L may be a liquid which has a vapor pressure equal to or higher than that of the liquid sample S at the same temperature. Preferably, the pressure adjusting liquid L has a vapor pressure curve close to that of the liquid sample S.

4.2. Measuring Method

Figure 11:
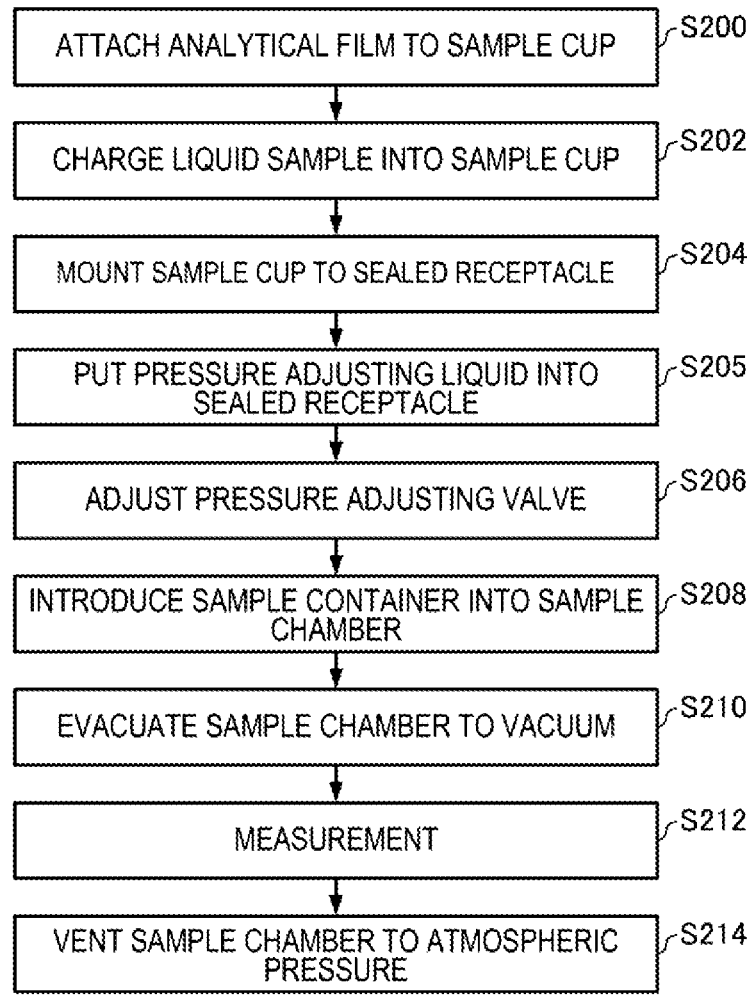
FIG. 11 is a flowchart illustrating one example of a measuring method using the sample container of FIG. 9.

FIG. 11 is a flowchart illustrating one example of a measuring method using the sample container 400. In the following description, only differences with the measuring method illustrated in the above-cited FIG. 5 are described; a description of similarities is omitted.

As shown in FIG. 3, the analytical film 20 is first attached to the sample cup 10 (S200). Then, the liquid sample S is charged into the sample cup 10 as also shown in FIG. 3 (S202).

Then, as shown in FIG. 9, the sample cup 10 is mounted into the sealed receptacle 40 (S204). The pressure adjusting liquid L is then put into the sealed receptacle 40 (S205). The sealed receptacle 40 has a recess at its bottom. The pressure adjusting liquid L is put into the recess and then the cover 44 is closed.

Then, the pressure adjusting valve 50 is adjusted (S206). The preset pressure is so determined that, in the sample chamber 8 placed in a vacuum atmosphere at a given pressure, the pressure in the sealed receptacle 40 is higher than the pressure at which the liquid sample S boils and lower than the pressure at which the analytical film 20 is damaged. There is no restriction on the order in which the steps S200, S202, S204, S205, and S206 are carried out.

Then, as shown in FIG. 10, the sample container 400 receiving the liquid sample S is introduced into the sample chamber 8 of the XRF analyzer 1 (S408). The sample chamber 8 is then evacuated to a vacuum and placed in a vacuum atmosphere at a given pressure (S210). At this pressure, X-rays emanating from light elements in the liquid sample S can be detected by the detector 7. At this time, as the pressure in the sample chamber 8 drops, the pressure in the sealed receptacle 40 also drops. The pressure difference between the interior space 102 of the sealed receptacle 40 and the sample chamber 8 outside the sealed receptacle 40 is maintained at the preset pressure by the operation of the pressure adjusting valve 50. The interior of the sealed receptacle 40 is maintained at the pressure higher than the pressure at which the liquid sample S boils and lower than the pressure at which the analytical film 20 is damaged.

Then, the liquid sample S is measured by X-ray fluorescence spectrometry (S212). When the pressure in the sample chamber 8 reaches the preset, given pressure and becomes constant, the measurement is started.

If the sample container 400 is caused to reside in the sample chamber 8 in a vacuum atmosphere for a long time by a prolonged measurement, the sample container 400 can suppress the drop of the pressure inside the sample cup 10 charged with the liquid sample S. That is, in the sample container 400, if the measurement is performed for a long time, the pressure inside the sample cup 10 can be maintained higher than the pressure at which the liquid sample S boils and lower than the pressure at which the analytical film 20 is damaged, for the reason described later.

After the end of the measurement, the sample chamber 8 is vented to atmospheric pressure (S214). Because of the processing steps described so far, the liquid sample S can be measured.

Figure 12:
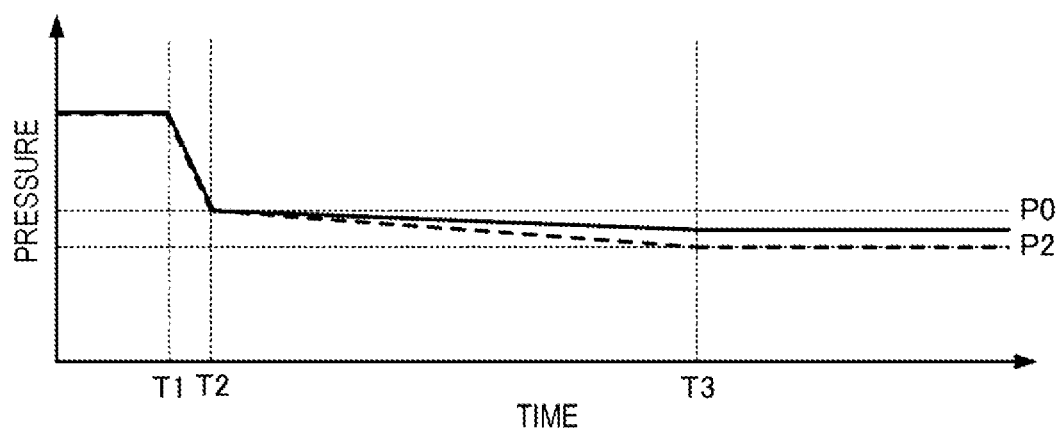
FIG. 12 is a graph showing variations in the pressure within the interior space of a sealed receptacle and variations in the pressure within the interior space of a sample cup.

FIG. 12 is a graph showing variations in the pressure in the interior space 102 of the sealed receptacle 40 and variations in the pressure in the interior space 104 of the sample cup 10. In FIG. 12, the pressure in the interior space 102 of the sealed receptacle 40 is indicated by a broken line, while the pressure in the interior space 104 of the sample cup 10 is indicated by a solid line.

Vacuum pumping of the sample chamber 8 is initiated at instant T1 and the sample chamber 8 reaches a given pressure at instant T2. At this time, the pressure in the interior space 102 of the sealed receptacle 40 is maintained at pressure PO (pressure level indicated by the higher dotted line) higher than the pressure at which the liquid sample S boils and lower than the pressure at which the analytical film 20 is damaged.

If the sample container 400 is made to stay for a long time in the sample chamber 8 that is in a vacuum atmosphere due to a prolonged measurement, gas gradually leaks from clearance gaps in the sealed receptacle 40 and the pressure in the interior space 102 of the sealed receptacle drops. Since the interior space 102 of the sealed receptacle 40 and the interior space 104 of the sample cup 10 are partitioned from each other by the porous film 90, the pressure in the receptacle space 102 drops faster than the pressure in the cup space 104.

The pressure in the receptacle space 102 drops and, at instant T3, the pressure in the receptacle space 102 is greater than the vapor pressure P2 (pressure level indicated by the lower dotted line) of the pressure adjusting liquid L. This initiates evaporation of the pressure adjusting liquid L.

Because the pressure in the receptacle space 102 drops faster than the pressure in the interior space 104 of the sample cup 10, the pressure adjusting liquid L starts to evaporate earlier than the liquid sample S if the vapor pressure of the pressure adjusting liquid L and the vapor pressure of the liquid sample S are equal at the same temperature.

The evaporation of the pressure adjusting liquid L suppresses the pressure in the receptacle space 102 from decreasing. The pressure rise caused by evaporation of the pressure adjusting liquid L is balanced by the pressure decrease caused by the leakage, whereby the pressure in the receptacle space 102 can be maintained constant.

Because the receptacle space 102 and cup space 104 are partitioned from each other by the porous film 90, the cup space 104 is maintained at a higher pressure than in the receptacle space 102. This makes it possible to maintain the pressure in the cup space 104 higher than the pressure at which the liquid sample S boils and lower than the pressure at which the analytical film 20 is damaged.

An example has been described in which the pressure adjusting liquid L is identical in vapor pressure to the liquid sample S but the requirement is only that the pressure adjusting liquid L has a vapor pressure equal to or greater than that of the liquid sample S. Consequently, the pressure adjusting liquid L evaporates earlier than the liquid sample S. Hence, the pressure in the cup space 104 can be maintained at a pressure higher than the pressure at which the liquid sample S boils and lower than the pressure at which the analytical film 20 is damaged.

4.3. Advantageous Effects

The sample container 400 includes the porous film 90 which is mounted across the first opening 12 and which acts to produce a pressure difference between the interior space 102 of the sealed receptacle 40 and the interior space 104 of the sample cup 10. Therefore, by receiving the pressure adjusting liquid L in the sealed receptacle 40, if the sample container 100 is kept positioned in the vacuum atmosphere of the sample chamber 8 for a long time as described previously, the pressure in the cup space 104 can be maintained at a pressure higher than the pressure at which the liquid sample S boils and lower than the pressure at which the analytical film 20 is damaged.

4.4. Modifications

In the fourth embodiment described above, the porous film 90 is used to produce a differential pressure between the interior space 102 of the sealed receptacle 40 and the interior space 104 of the sample cup 10. The differential pressure generator for producing a differential pressure between the receptacle space 102 and the cup space 104 is not restricted to the porous film 90. For example, a pressure adjusting valve may be mounted in the first opening 12 of the sample cup 10. An orifice may be mounted in the first opening 12. With a pressure adjusting valve or an orifice, a pressure difference can be created between the interior space 102 of the sealed receptacle 40 and the interior space 104 of the sample cup 10 in the same manner as with the porous film 90.

It is to be understood that the present invention is not restricted to the foregoing embodiments but rather can be implemented in various modified forms. For example, the present invention embraces configurations (e.g., configurations identical in function, method, and results or identical in purpose and advantageous effects) which are substantially identical to the configurations described in any one of the above embodiments. Furthermore, the invention embraces configurations which are similar to the configurations described in any one of the above embodiments except that their nonessential portions have been replaced. Additionally, the invention embraces configurations which are identical in advantageous effects to, or which can achieve the same object as, the configurations described in any one of the above embodiments. Further, the invention embraces configurations which are similar to the configurations described in any one of the above embodiments except that a well-known technique is added.

What is claimed is:

1. An X-ray fluorescence analyzer, comprising:
a sample chamber maintained in a vacuum atmosphere; and
a sample container placed in the sample chamber;
wherein the sample container comprises:
a sealable first receptacle having a pressure therein;
a pressure adjusting valve for adjusting the pressure in the first receptacle;
a second receptacle for receiving a liquid sample and having both a first opening and a second opening located inside and outside, respectively, of the first receptacle; and
an analytical film closing off the second opening and transmitting X-rays,
wherein measurement is performed in the sample chamber maintained in the vacuum atmosphere by irradiating the liquid sample contained in the sample container with X-rays.

2. The X-ray fluorescence analyzer as set forth in claim 1, wherein said pressure adjusting valve maintains constant a pressure difference between the inside and outside of said first receptacle in a vacuum atmosphere.

3. The X-ray fluorescence analyzer as set forth in claim 1, wherein said pressure adjusting valve opens if the pressure inside said first receptacle is greater than the pressure outside the first receptacle and, at the same time, a pressure difference between the inside and outside of the first receptacle is greater than a preset pressure and closes if the pressure inside the first receptacle is greater than the pressure outside the first receptacle and, at the same time, the pressure difference between the inside and outside of the first receptacle is equal to or less than the preset pressure that is variable.

4. The X-ray fluorescence analyzer as set forth in claim 1, further comprising a differential pressure generator mounted in or across said first opening and operating to produce a pressure difference between an interior space of said first receptacle and an interior space of said second receptacle.

5. The X-ray fluorescence analyzer as set forth in claim 4, wherein said differential pressure generator is a porous film plugging up said first opening.

6. The X-ray fluorescence analyzer as set forth in claim 5, wherein a liquid having a vapor pressure equal to or higher than the vapor pressure of said liquid sample is received in said first receptacle.

7. The X-ray fluorescence analyzer as set forth in claim 1, further comprising a protective receptacle which covers said analytical film and comprises a protective film transmitting X-rays.

8. The X-ray fluorescence analyzer as set forth in claim 7, wherein said protective receptacle has a gas passageway interconnecting the inside and outside of the protective receptacle.

9. The X-ray fluorescence analyzer as set forth in claim 1, further comprising a film supporting member by which said analytical film is detachably supported.

10. A measuring method using a sample container comprising a sealable first receptacle having a pressure therein, a pressure adjusting valve for adjusting the pressure in the first receptacle, a second receptacle for receiving a liquid sample and having both a first opening and a second opening located inside and outside, respectively, of the first receptacle, and an analytical film closing off the second opening and transmitting X-rays, said method comprising the steps of:
- receiving the liquid sample in said second receptacle;
- introducing the sample container into a sample chamber of an X-ray fluorescence analyzer;
- lowering the pressure in the sample chamber such that the sample chamber is placed in a vacuum atmosphere; and
- irradiating the liquid sample received in the sample container with X-rays through the analytical film within the vacuum atmosphere of the sample chamber and detecting fluorescent X-rays responsively emitted from the liquid sample.

11. The measuring method as set forth in claim 10, wherein said pressure adjusting valve makes constant the pressure difference between the inside and outside of said first receptacle in the vacuum atmosphere.

12. The measuring method as set forth in claim 10, wherein said pressure adjusting valve is so set that, within the vacuum atmosphere of said sample chamber, the pressure inside said first receptacle is higher than the pressure at which said liquid sample boils and lower than the pressure at which said analytical film is damaged.

13. The measuring method as set forth in claim 10, further comprising the step of receiving in said first receptacle a liquid having a vapor pressure equal to or higher than the vapor pressure of said liquid sample; and
- wherein said sample container comprises a differential pressure generator mounted in or across said first opening and operating to produce a pressure difference between said first receptacle and said second receptacle.

14. The measuring method as set forth in claim 10, wherein said sample container comprises a protective receptacle mounted to the first receptacle and covering said analytical film, and wherein the protective receptacle comprises a protective film transmitting X-rays.

15. The measuring method as set forth in claim 14, wherein said protective receptacle has a gas passageway interconnecting the inside and outside of the protective receptacle.

* * * * *